(12) United States Patent
Sun et al.

(10) Patent No.: US 12,607,773 B2
(45) Date of Patent: Apr. 21, 2026

(54) HAIL DETECTION SENSOR

(71) Applicant: Beijing Tashan Technology Co., Ltd., Beijing (CN)

(72) Inventors: Tengchen Sun, Beijing (CN); Kai Wang, Beijing (CN)

(73) Assignee: Beijing Tashan Technology Co., Ltd., Beijing (CN)

( * ) Notice: Subject to any disclaimer, the term of this patent is extended or adjusted under 35 U.S.C. 154(b) by 301 days.

(21) Appl. No.: 18/453,485

(22) Filed: Aug. 22, 2023

(65) Prior Publication Data

US 2024/0068845 A1 Feb. 29, 2024

(51) Int. Cl.
*G01W 1/14* (2006.01)
*G01D 5/241* (2006.01)
*G01L 1/14* (2006.01)
*G01L 5/00* (2006.01)

(52) U.S. Cl.
CPC .............. *G01W 1/14* (2013.01); *G01D 5/241* (2013.01); *G01L 1/142* (2013.01); *G01L 5/0052* (2013.01)

(58) Field of Classification Search
CPC ........ G01D 5/24; G01D 5/241; G01D 5/2417; G01L 1/14; G01L 1/142; G01L 5/0052; G01W 1/14
See application file for complete search history.

(56) References Cited

U.S. PATENT DOCUMENTS

| | | | | |
|---|---|---|---|---|
| 2005/0174720 A1* | 8/2005 | Luukkala | ................ | G01W 1/14 361/600 |
| 2014/0007703 A1* | 1/2014 | Martin | .................... | G01W 1/00 52/173.1 |
| 2020/0081153 A1* | 3/2020 | Schiff | .................... | G01H 11/08 |

FOREIGN PATENT DOCUMENTS

| | | | | | |
|---|---|---|---|---|---|
| CN | 110455488 A | * | 11/2019 | .............. | G01M 7/08 |
| DE | 102014112926 A1 | * | 3/2016 | .............. | G01W 1/14 |

* cited by examiner

*Primary Examiner* — Benjamin R Schmitt
(74) *Attorney, Agent, or Firm* — Sisson & Banyas, Attorneys at Law, LLC; Edwin A. Sisson

(57) ABSTRACT

A hail detection sensor, comprising an electrically conductive base and a plurality of detection components; the detection component comprises a support, a displacement detection device, an elastic body and a force-bearing part, the surface of the force-bearing part has a Zone 1 being a conductor for impact of the measured hail the force-bearing part is fixed on the support through the elastic body, the displacement detection device is used to obtain a first signal reflecting mechanical vibration generated by the impacted force-bearing part. There is a gap between each Zone 1. The area of each Zone 1 is smaller than and the sum of the areas of each Zone 1 is larger than the standard hail density measurement area; at least one of the supports is fixed to the base, each force-bearing part is electrically connected to the base and electrically connected to earth through the base.

13 Claims, 9 Drawing Sheets

| | 材质1 |
|---|---|
| | 材质2 |

HAIL DETECTION SENSOR

TECHNICAL FIELD

The utility model relates to the field of meteorological monitoring, in particular to a sensor component for hail detection.

BACKGROUND TECHNIQUE

Hail disaster is a severe meteorological disaster caused by strong convective weather system, which is fierce and high intensity, and is often accompanied by intermittent disastrous weather processes such as strong wind and sharp drop in temperature. At present, the outdoor monitoring of hail is mainly focused on the direction of acoustic and vision, and mainly detects the diameter and density (frequency) of hail. In China, low-cost imprint plates are generally used for intermittent measurement. There are advanced acoustic products in the United States, but they are very expensive, and the price is more than 100,000 RMB in China. In fact, the destructive force of hail depends on the impact impulse of the hail, and the acoustic or visual system cannot detect the impulse, but the tactile system can accurately calculate the magnitude of the impulse by detecting the displacement of the hit object with known mass.

Patent CN201910868057 proposes to detect the impact load of hail through the membrane structure, and uses a laser displacement sensor to detect the displacement of the membrane surface to measure the impulse; Patent DE102014112926A1 proposes to use a converter (3) to record the vibration caused by at least one precipitation particle (such as hail) hitting the impact body (2), calculate kinetic energy by evaluating the electrical signal generated by the converter (3); Patent US20050174720A1 proposes to detect shock pulse of hydrometeor by means of a surface (2) mounted on a frame (5) and adapted to receive hydrometeors (such as hail). The above three ways can be classified as using the surface structure of the tactile system for detection. For tactile detection of hail, the current technical problem to be overcome (for example, the above three ways have such technical defects) is the measurement accuracy caused by vibration. Specifically, because the detection is based on the shock caused by the impact, if the shock caused by the impact of the previous hailstone has not completely ended, and the next hailstone hits it, then the shock will be superimposed, making it difficult for the sensor to measure accurately.

On the other hand, the area of the measuring surface is one of the key factors in hail detection. Theoretically, the larger measuring surface, the higher accuracy of hailstone measurement. Each country have stipulated the minimum area of the measurement surface for hail detection. For example, the "Specification of hail event surveys" was formulated in the national standard GB/T 34296-2017 of the People's Republic of China, which stipulates that the minimum standard area for hailstorm calculation (standard hail density area) is 30 cm×30 cm. Other countries such as the European and American countries have their own regulations. For other systems, such as acoustic and vision, the larger measurement area of the hailstone, the more conducive to the improvement of the measurement accuracy; but for the tactile system, the calculated area of the hailstone and the above-mentioned measurement accuracy caused by the shock are conflicts that need to be overcome.

Utility Model Specification

The purpose of this utility model is to reduce the probability of continuous hail impact in a short period of time under the premise of using the tactile system to detect the hail impulse, using the tactile system to improve the detection accuracy of hail, and at the same time, realize grounding cost control and ensure economical when installing sensors.

To this end, provided a hail detection sensor, including a base and at least two detection components; each of the detection components is provided with a support, a displacement detection device, an elastic body, and a force-bearing part of a given quality, the surface of the force-bearing part is provided with a Zone 1 for the impact of the measured hail, the force-bearing part is a conductor, the force-bearing part is fixed on the support through an elastic body, and the displacement detection device is used to obtain the first signal reflecting the mechanical vibration generated by the impact of the force-bearing part, wherein there is a gap between each of the Zone 1, the area of each of the Zone 1 is configured to be smaller than the standard hail density calculation area, and the sum of the areas of the Zone 1 on the hail detection sensor is configured to be larger than the standard hail density measurement area, and the said standard hail density measurement area refers to the standards of various countries or regions; at least one of the support is fixed to the base which is electrically conductive, each force-bearing part is electrically connected to the base and electrically connected to the earth through the base.

As an improvement, at least one of Zone 1 of the said detection components is larger than the Zone 1 of the other detection components.

As an improvement, the quality of the at least one force-bearing part of the said detection components is larger than the quality of the force-bearing components of other detection components; and/or the elastic coefficient of at least one elastic body of the said detection components is larger than the elastic coefficient of elastic body of the other detection components.

As an improvement, the elastic body and the support are electrically conductive, and the force-bearing part is electrically connected to the base through the elastic body and the support.

As an improvement, the displacement detection device includes a capacitor with a first electrode and a second electrode, the force-bearing part is used as the first electrode and the second electrode is arranged on the support, the hail detection sensor also features a capacitance-to-digital converter and a logic processor, and the capacitance-to-digital converter is respectively connected to the logic processor and the second electrode. The logic processor obtains the first signal reflecting the mechanical vibration according to the capacitance value between the second electrode and the first electrode of the detection component to which it belongs. Wherein further, the force-bearing part is configured to be nested with the support of the detection component to which it belongs, and a sealed space is formed between, and the second electrode and the elastic body are located in the sealed space. The two ends of the elastic body are respectively abutted against the belongs force-bearing part and the supporting part of the detection component, and the second electrode is configured as a continuous body or a discrete body arranged around the elastic body. A dust-proof sealing part is provided at the position where the force-bearing part and the supporting part are nested with each other. The displacement detection device may also include a PCB board, and the second electrode is arranged on the surface of the PCB board.

As an improvement, the minimum gap in the horizontal projection direction between each of the Zone 1 is configured to be larger than 10 cm.

As an improvement, the hail detection sensor is locally powered by solar or battery.

As an improvement, the output signal of the hail detection sensor is transmitted to the weather station by wireless communication.

As an improvement, the shape of the base is a plate-shaped structure which is electrically conductive, and its area meets the requirements for the area of the ground net buried underground for lightning protection, and each detection component in the hail detection sensor stands on the plate-shaped structure respectively and establish an electrical connection with it; or, the shape of the base is a columnar structure, the columnar structure is buried underground, and the area meets the area requirements of the ground net buried underground for lightning protection, and each detection component in the hail detection sensor is fixed to the base by a conductive bracket.

Compared with the current technology, the hail detection sensor of this utility model has the following advantages:

(1) The sum of the areas of the Zone 1 is larger than the standard hail density measurement area, the hail detection sensor can achieve full sampling, and the overall detection accuracy reach the standard. The probability of continuous hailstone impact in a short period of time reaches the balance between the area and accuracy under the detection of the tactile system;

(2) Outdoor lightning protection is realized by electrically connecting the top of force-bearing part to the ground, and using the idea of "combination", each force-bearing part is electrically connected to the ground through the base after being united, which greatly reduces the grounding cost and ensures economical when installing sensors;

(3) After being divided into multiple small areas, the single area is reduced, which is conducive to the impact of hailstones on the central area of the first area, and improves the lateral twist of the stressed parts caused by the impact of hailstones on the edge;

(4) It is possible to implement multiple area parallel calculations, and the detection time can be compressed to the shortest, achieving balance between speed and full sampling;

(5) There are gaps between the Zone 1, together with the elastic displacement capacity of the force-bearing part, it is possible to solve the problem that the accumulating of hailstones on the force-bearing part leads to the decrease of measurement accuracy over time.

EMBODIMENT

Figure 1:
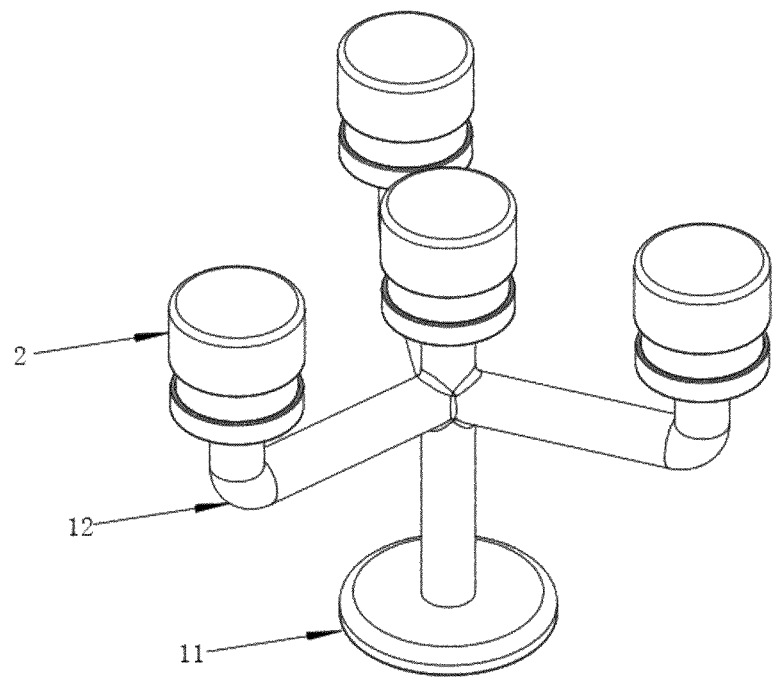
FIGS. 1 to 3 respectively show the structure of the utility model when the number of detection components is four, five or six.
Figure 2:
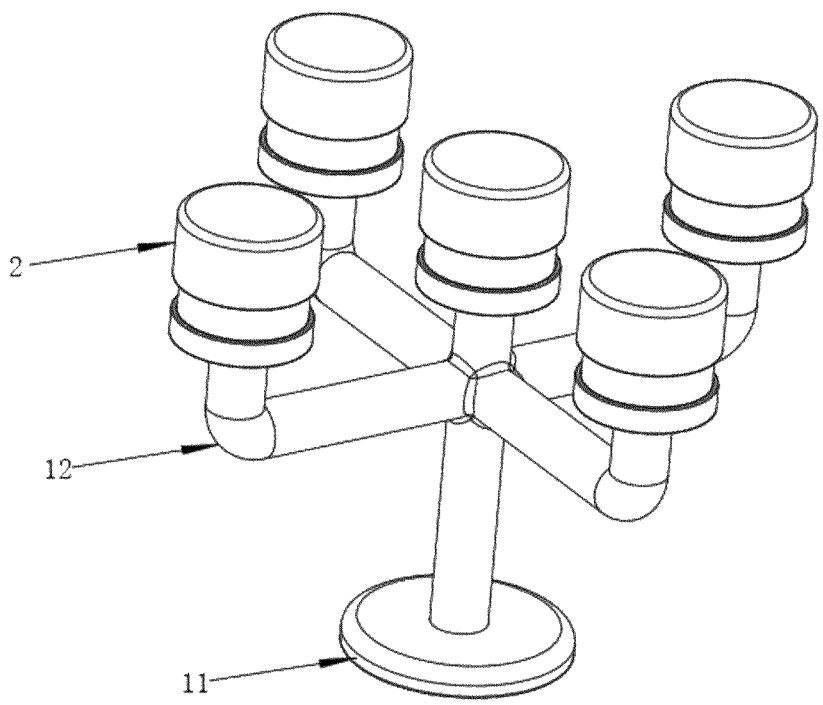
Figure 3:
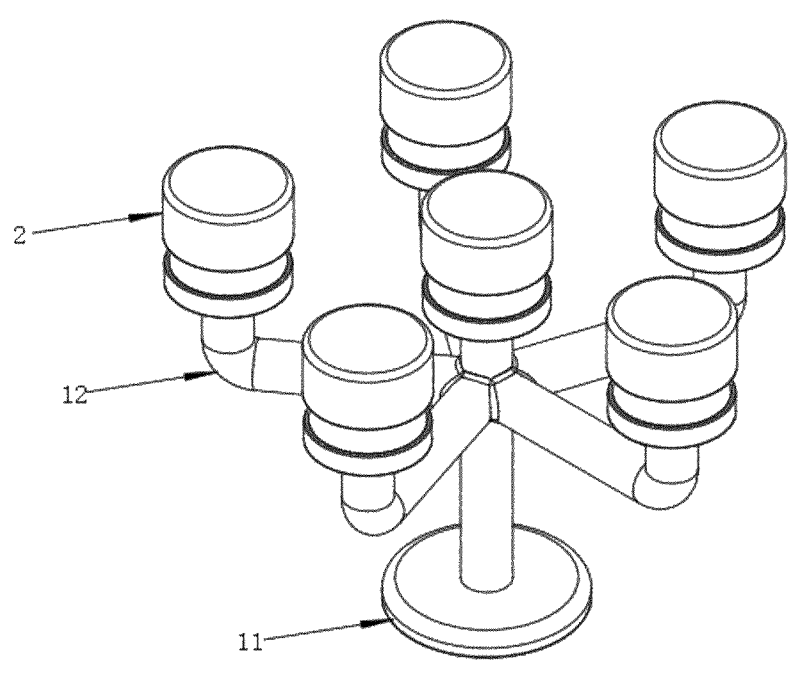

The hail detection sensor provided in the utility model, referring to FIG. 1, FIG. 2 or FIG. 3, includes a base 11, a conductive support 12 and a detection components 2, the number of detection components 2 is configured as two or more than two, and at least one or all of the detection component 2 are fixed to the base 11 through the bracket 12, and the base 11 is buried under the ground when in use, and is connected to the ground as a lightning protection ground net. For each detection component 2, referring to FIG. 4a and FIG. 4b, a support 21, a displacement detection device 22, an elastic body 23 and a force-bearing component 24 of a given mass.

Wherein, the support 21 mainly acts as a load bearing, and the force-bearing part 24 is fixed on the support 21 through the elastic body 23. The surface of the force-bearing part 24 is provided with a Zone 1 for the impact of hail, with the existence of the elastic body 23 between them, the force-bearing part 24 has elastic displacement capacity, and it will generate mechanical vibration when it is hit. The displacement detection device 22 is used to capture the mechanical vibration generated by the impact of the force-bearing part 24 and convert it into a first signal that can reflect the mechanical vibration, wherein the displacement detection device 22 is configured as devices that can detect the displacement of the object, such as devices that detect displacement based on changes in the magnetic field caused by magnet movement, devices that detect displacement based on optical signals, devices that detect displacement based on image technology, vibration sensors, or devices that convert displacement based on acceleration signals, etc. Not limited here.

In order to reduce the probability of continuous hail impact in a short period of time, in the utility model, as shown in FIG. 1, FIG. 2, and FIG. 3, gaps are set between each Zone 1, and the area of each Zone 1 is set to be smaller than the standard hail density measurement area, the sum of the areas of each Zone 1 on the hail detection sensor is set to be larger than the standard hail density measurement area, wherein the standard hail density measurement area refers to the standards of each country or region. For example, the standard hail density measurement area can be set to 30 cm×30 cm in China. The sum of the areas of the Zone 1 is larger than the standard hail density measurement area, the hail detection sensor can achieve full sampling, and the overall detection accuracy reach the standard. The probability of continuous hailstone impact in a short period of time reaches the balance between the area and accuracy under the detection of the tactile system; And it is possible to implement multiple area parallel calculations, and the detection time can be compressed to the shortest, achieving balance between speed and full sampling; In addition, there are gaps between the Zone 1, together with the elastic displacement capacity of the force-bearing part 24, it is possible to solve the problem that the accumulating of hailstones on the force-bearing part leads to the decrease of measurement accuracy over time. Moreover, after being divided into multiple small areas, the single area is reduced, which is conducive to the impact of hailstones on the central area of the first area, and improves the lateral twist of the stressed parts caused by the impact of hailstones on the edge.

Considering that the hail detection sensor needs to work in the outdoor environment for a long time, in the utility model, the force-bearing part 24 is set as a conductor, so that at least one or all of the support members 21 are fixed on the base 11, and the base 11 is electrically conductive, and then each force-bearing component 24 is electrically connected to the base 11 respectively, and then electrically connected to the ground through the base 11. On the one hand, outdoor lightning protection is realized by electrically connecting the top of force-bearing parts 24 to the ground. More importantly, using the idea of "combination", each force-bearing part is electrically connected to the ground through the base after the base is united, which greatly reduces the grounding cost and ensures economical sensor installation.

Figure 5:
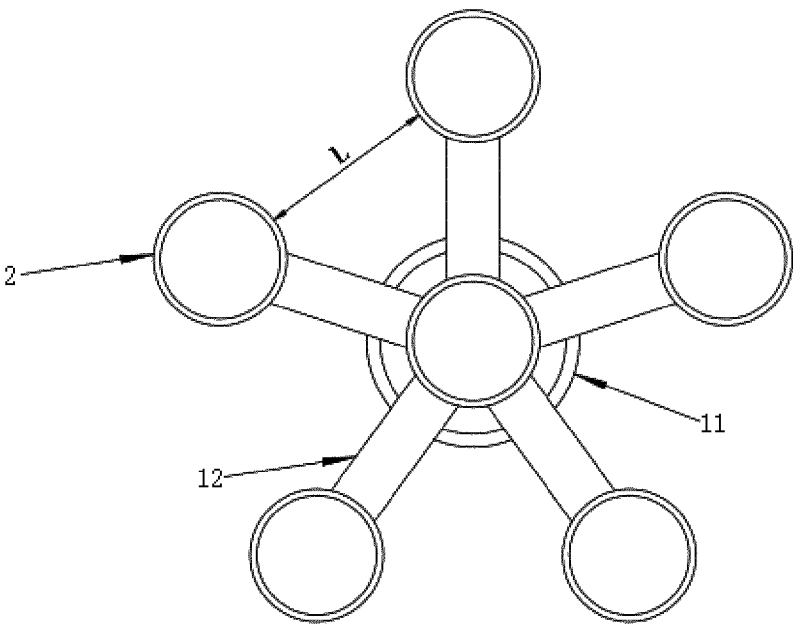
FIG. 5 shows the minimum gap in the horizontal projection direction between the Zone 1.

In the utility model, by summarizing the shape law of hail in the natural state, the minimum gap in the horizontal projection direction between each Zone 1 can be configured to be more than 5 cm, or more than 8 cm, and the most preferable effect is shown in FIG. 5, the minimum gap L in the horizontal projection direction between each Zone 1 is configured to be greater than 10 cm, so as to achieve the best effect of reducing hail accumulation.

In order to further avoid the accumulation of hailstones, in the utility model, as the most preferable, the maximum area of the Zone 1 of a single force-bearing part 24 is further limited to less than 100 square centimeters.

In the utility model, the first signal output by the displacement detection device 22 can be output to a control system outside the sensor, or can be output to a control system installed inside the sensor. For the latter, a PCB board 20 (also known as a main board or circuit board) for logic control can be independently arranged in each detection components 2 during design, and a logic processor is arranged on the PCB board 20; or at least one of the detection components 2 or the base arrange a PCB board 20, and an electrical connection relationship is established directly with the displacement detection device 22 in each detection components 2 through analog routing or using wires. Of course, it is more preferable to set the PCB board 20 independently to improve the power consumption problem caused by the long line resistance. In other words, the voltage value output by the displacement detection device 22 can be designed to be small, so that the sensor meets ultra-low power consumption and long standby time. On this basis, after the first signal output by the displacement detection device 22 is processed by the control system, it can at least be converted into the impulse information of the output hail, wherein, since the mass of the force-bearing component 24 is known, the impulse is passed through the displacement of the force-bearing pat 24 Quantity is converted.

Figure 6A:
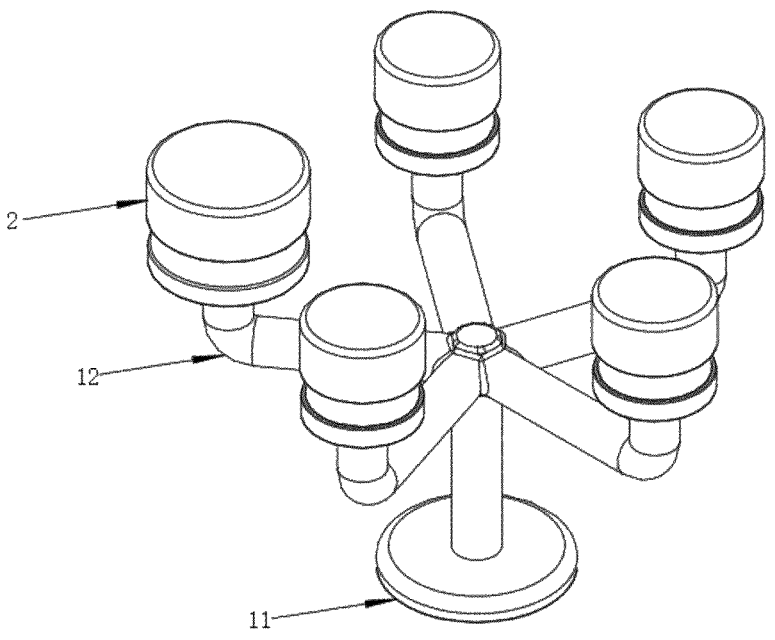
FIG. 6a shows a schematic structural view in which at least one of the detection components has a Zone 1 area larger than that of the other detection components.
Figure 6B:
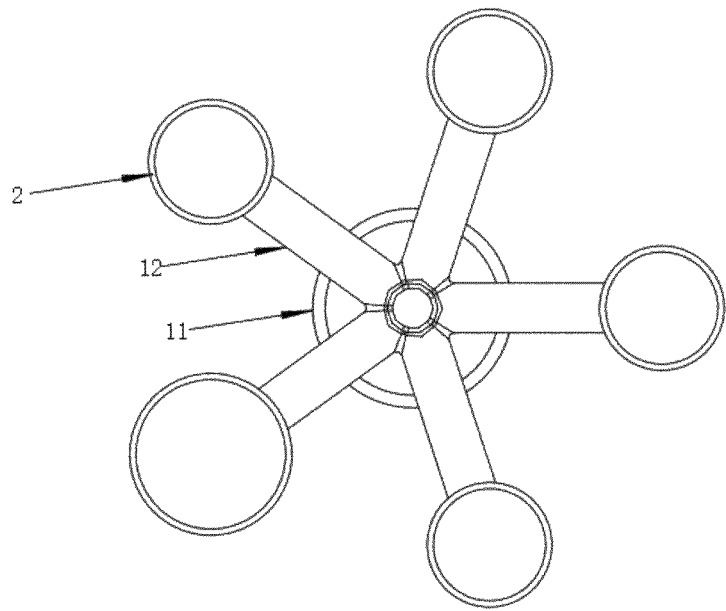
FIG. 6b shows a front view of the structural schematic diagram.

As an improved solution, in the utility model, as shown in FIG. 6a and FIG. 6b, at least one of the Zone 1 of the detection components 2 can be further designed to have a larger area than other detection components 2. The reason for this design is that the area is inversely proportional to the measurement sensitivity. The larger the area, the lower the sensitivity. Therefore, by designing different Zone 1 sizes between the detection components 2, different measurement sensitivities are achieved to match hailstones of various masses and diameters further improve the measurement accuracy.

Figure 7A:
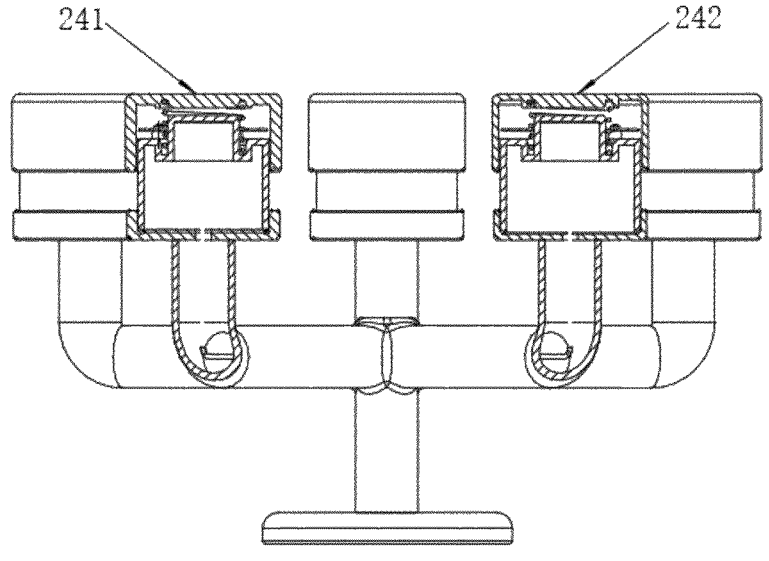
FIG. 7a shows that the wall thickness of at least one force-bearing part is thicker than that of other detection components.
Figure 7B:
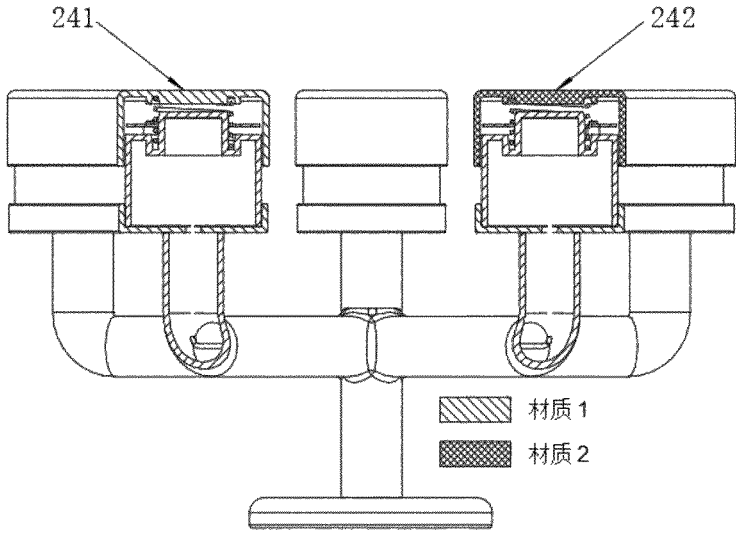
FIG. 7b shows that the material density of at least one force-bearing part is larger than that of other detection components.
Figure 7C:
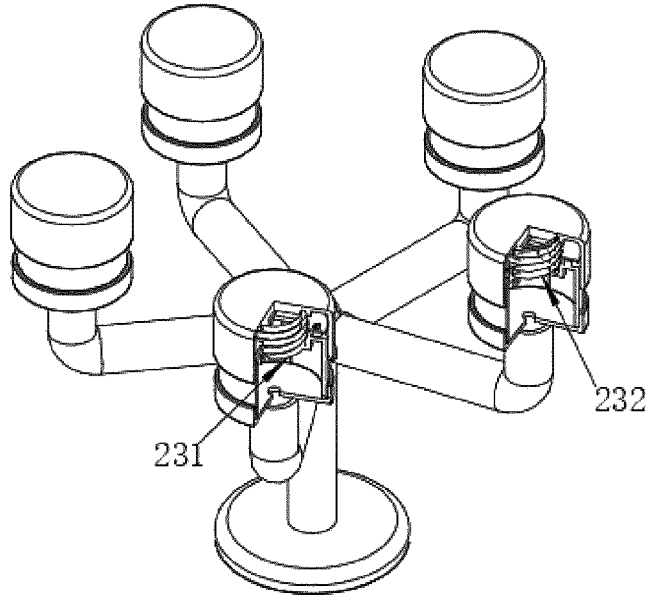
FIG. 7c shows the elastic coefficient of at least one spring larger than the elastic coefficient of other springs.

As another improvement, the previous improvement can be used in combination, or used independently. Specifically, the mass of the force-bearing part 24 of at least one of the detection assemblies 2 can be set to be greater than the mass of the force-bearing parts 24 of the other detection assemblies 2, and/or the elastic coefficient of the elastic body 23 of at least one of the detection components 2 is larger than the elastic coefficient of the elastic body 23 of the other detection components 2. For example, in the first case, the area of the Zone 1 of each detection components 2 can be designed to be the same, and the wall thickness of the force-bearing part 241 of at least one detection components is larger than the force-bearing part 242 of other detection components, as shown in FIG. 7a; In the second case, the area of the Zone 1 of each detection components 2 can be designed to be the same, and the material density of the force-bearing part 241 of at least one detection components 2 is larger than the force-bearing part 242 of other detection components, as shown in FIG. 7b; Three situations can be designed in which at least one spring 231 of the detection components 2 has a larger spring constant than the spring 232 of the other detection components 2, as shown in FIG. 7c. The design intent of this improvement is that in the framework of the force-bearing part 24 plus the elastic body 23, the vibration of the hail impact mainly depends on the quality of the force-bearing part 24 and the elastic coefficient of the elastic body 23, with the quality of the force-bearing part 24 being. For example, different masses of force-bearing parts have different impact responses to hail of the same mass. For example, when a 50 g hail hits a 1 kg force-bearing component and a 10 g force-bearing component, the response of the former is much weaker than that of the latter. Similarly, Elastic bodies with different elastic coefficients have different impact responses to hailstones of the same mass. Taking advantage of this feature, the utility model designs different masses of the stress-bearing parts on the sensor and/or elastic coefficients of each elastic body. Different measurement ranges can be formed on the same sensor, that is, range classification can be realized, and then hailstones of various masses and diameters can be matched, which can further improve the measurement accuracy.

In the utility model, the elastic body and the support are electrically conductive. At this time, the force-bearing part 24 can establish an electrical connection with the base 11 through the elastic body 23, the support 21, and the conductive support 12, for example, the elastic body 23 using metal springs, on the one hand, the spring undertakes the function of the elastic body, and on the other hand, the spring undertakes the function of electrical connection, so as to simplify the structure, reduce the generation of accompanying wires, and avoid the decline in detection stability caused by flying and solder joint detachment during the use of the accompanying wires, and to ensure the stability of sensor detection.

Figure 4A:
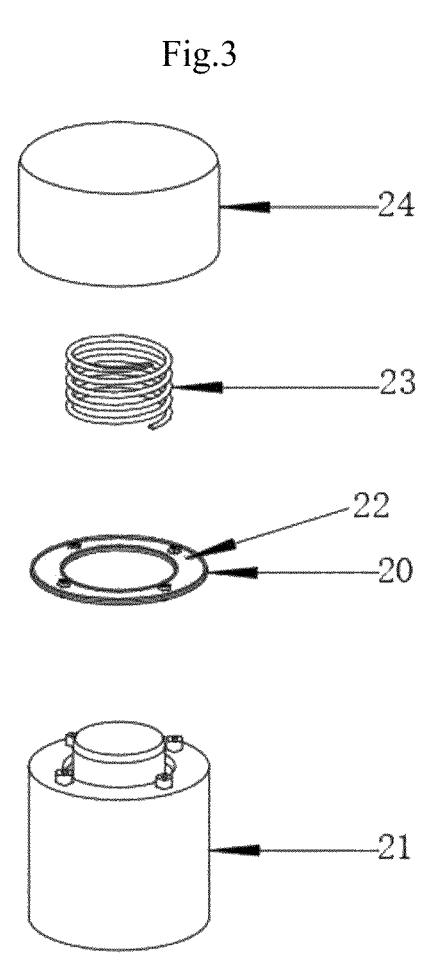
FIG. 4a shows an exploded view of the structure of the detection components of the utility model.
Figure 4B:
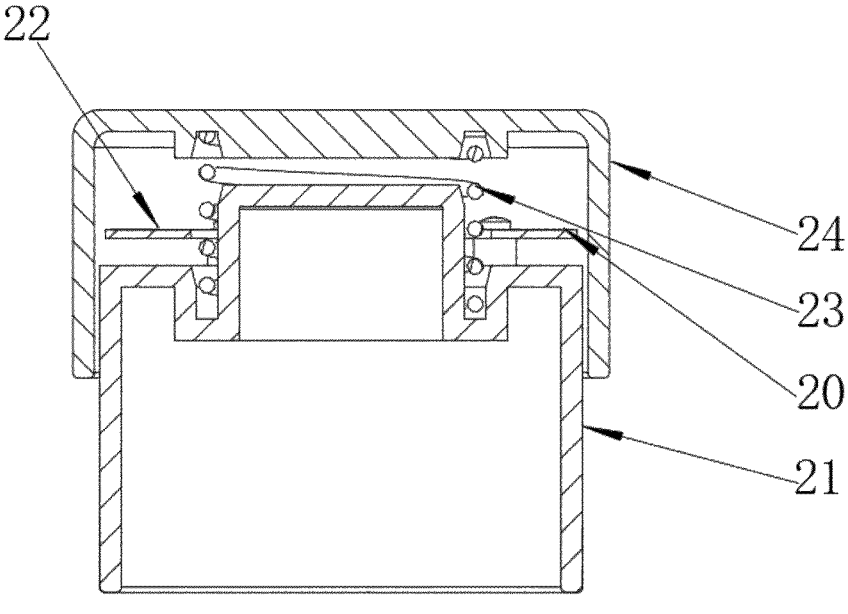
FIG. 4b shows a cutaway view of the detection components of the utility model.
Figure 8:
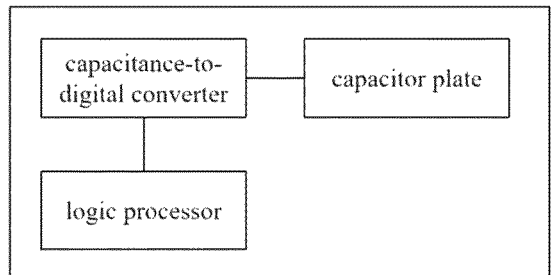
FIG. 8 shows a block diagram of the circuit.

In the utility model, as a third improvement scheme, as shown in FIG. 4a and FIG. 4b, the displacement detection device 22 is configured a capacitor include a first electrode and a second electrode, wherein the force-bearing part 24 is used as the first electrode, the second electrode is disposed on the support 21, where the second electrode should be understood as a reference, and the number can be one or more. The hail detection sensor is also equipped with a capacitance-to-digital converter (CDC). As shown in FIG. 8, the capacitance-to-digital converter is respectively connected to the logic processor and the second electrode. The capacitance value between the electrodes obtains the first signal reflecting the mechanical vibration, and the capacitance value can be the self-capacitance value of the first electrode to the second electrode, or in the case of the second electrode is discrete multi-chip, obtained by the mutual capacitance value between the second electrode caused by the movement of the first electrode. In this improved solution, the displacement detection device 22 is implemented in the form of a capacitor, and the cost of the capacitor is lower than that of most existing displacement detection devices. In terms of response speed, it is preceded only by the use of light for displacement detection (such as laser displacement measurement, but the cost of laser displacement measurement is much higher than that of capacitance, which is not conducive to large-scale outdoor laying). Therefore, displacement detection device 22 using capacitance can achieve the comprehensive optimization of cost and response speed. In addition, capacitance-to-digital conversion circuits (CDC) with mature technology, such as ADI7142 and ADI7147, can also be used to charge and discharge the measured capacitance multiple times by using Δ-Σ modulation and comparing it with the reference capacitance (see: U.S. Pat. No. 5,134,401) directly converts the measured capacitance value into a digital value, and improves the measurement sensitivity of capacitance to 1 ff level.

Among the above, the processor and CDC can be combined into one chip, such as the PSoC 4100S Plus series of CYPRESS, but its functional composition remains the same.

On the basis of the third improvement scheme, as a further improvement, as shown in FIG. 4*a* and FIG. 4*b*, the force-bearing part 24 is configured to be nested with the support 21 of the belongs detection component, and a sealed space is formed between the second electrode and the elastic body 23 are located in the sealed space. For example, the force-bearing part 24 is arranged as a cap-shaped structure, and is placed on the support 21. The space in the cap accommodates the second electrode and the elastic body 23 as a sealed space. On the one hand, using the conductive electric shielding effect of the force-bearing part 24 to ensure the independence of the magnetic field in the internal space, and improve the impact of outdoor lightning strikes on capacitance detection. On the other hand, the force-bearing part 24 acts as a protection and rainproof, reducing later use and maintenance. Preferably, as shown in FIG. 9*a*, FIG. 9*b*, FIG. 10*a*, FIG. 10*b*, the shape of the support 21 can be set as a barrel-shaped structure with the opening facing downwards, and the bottom of the barrel-shaped structure is nested with the conductive bracket 12 for sealing. As shown in FIG. 4*a* and FIG. 4*b*, the displacement detection device can also include a PCB board 20, and the second electrode is arranged on the surface of the PCB board 20. For example, the copper layer exposed on the surface of the PCB board 20 is used as an electrode, which can reduce the accompanying wires between the PCB board 20 and the second electrode to achieves the purpose of simplifying structure and improving stability.

Figure 9A:
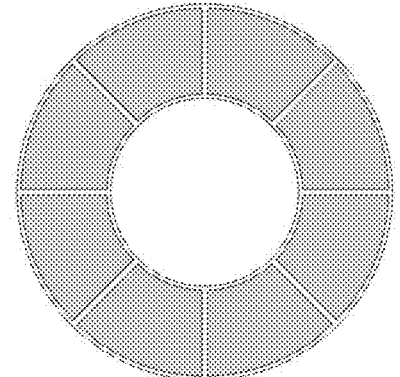
FIG. 9a shows a schematic diagram when the second electrode is a discrete body.
Figure 9B:
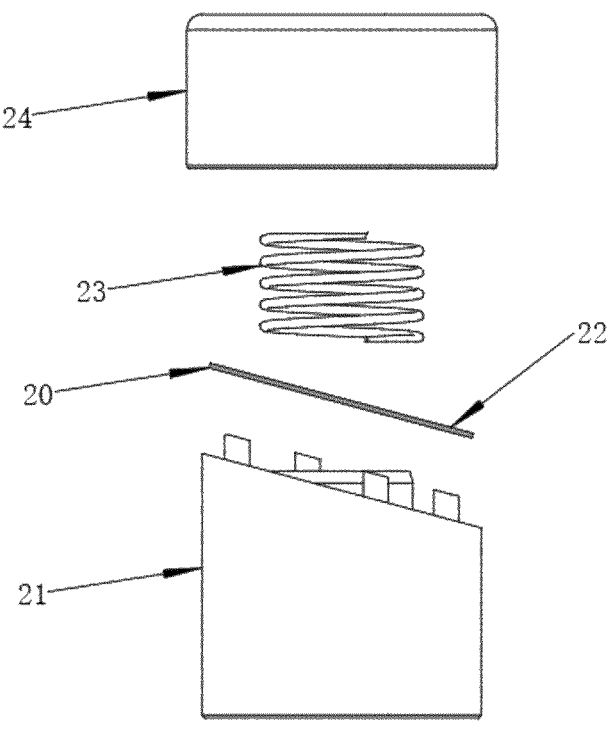
FIG. 9b shows a structural diagram of the inclined design of the discrete body electrode.
Figure 9C:
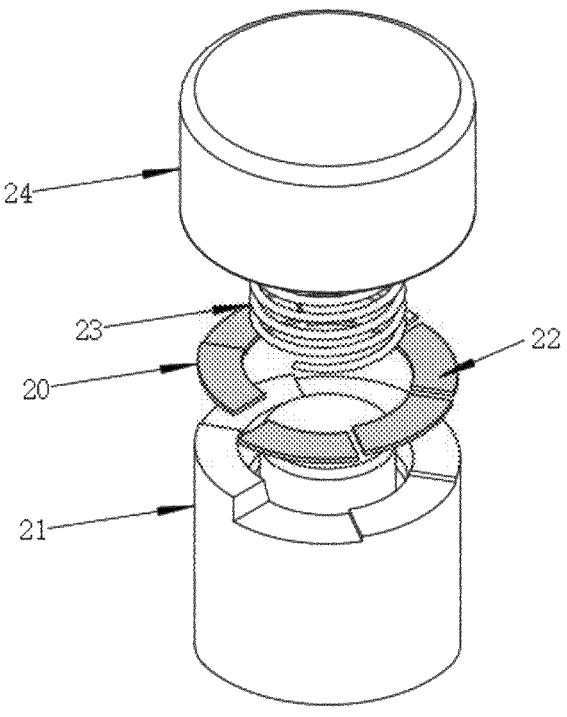
FIG. 9c shows the case where the discrete body electrode has high and low electrodes.

Still further, the two ends of the elastic body 23 are respectively arranged to abut against the force-bearing part 24 and the support 21 of the belongs detection components, and the second electrode is configured as a continuous body or a discrete body arranged the elastic body. Among them, the solution of discrete bodies, such as dividing the second electrode into discrete eight lobes as shown in FIG. 9*a*, which can bring further improvement in accuracy. Specifically, in the discrete body scheme, when the hailstone strikes and causes the stressed part to twist laterally, the capacitance value of the electrode sheet close to the side twist direction will be larger, and the capacitance value of the electrode piece away from the side twist direction will be smaller. In this way, the side twist direction can be measured by using the difference in capacitance value of each electrode piece, degree and other information, and then make corrections to the calculation results. The scheme of continuum and discrete body can be arranged on the same PCB, no matter whether the electrode sheets are discrete or continuous when the electrode sheets are on the same horizontal plane, which has the advantage of simple structure. More preferably, the discrete electrode sheets can be arranged different horizontal plane, that is, there are electrodes with different heights in the vertical direction, such as the inclined structure shown in FIG. 9*b* or the high and low electrodes described in FIG. 9*c*. The difference in self-capacitance between the high and low electrodes relative to the force-bearing part 24 can correct the collected data, which can improve the detection accuracy.

Figure 10A:
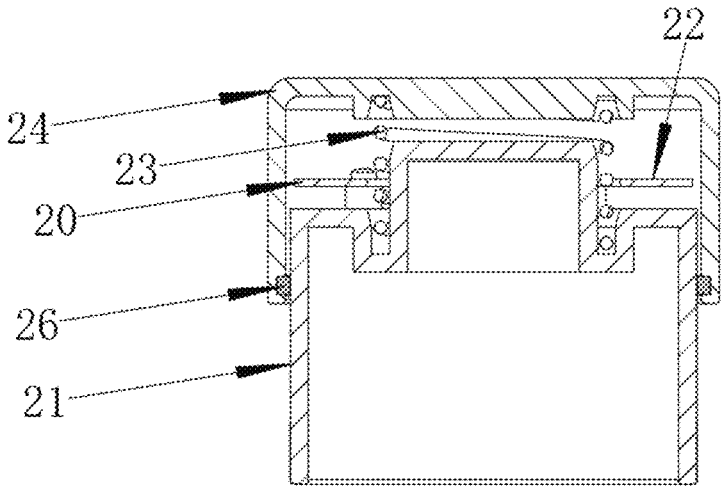
FIG. 10a shows a cutaway view of the detection component with a dust-proof sealing component.
Figure 10B:
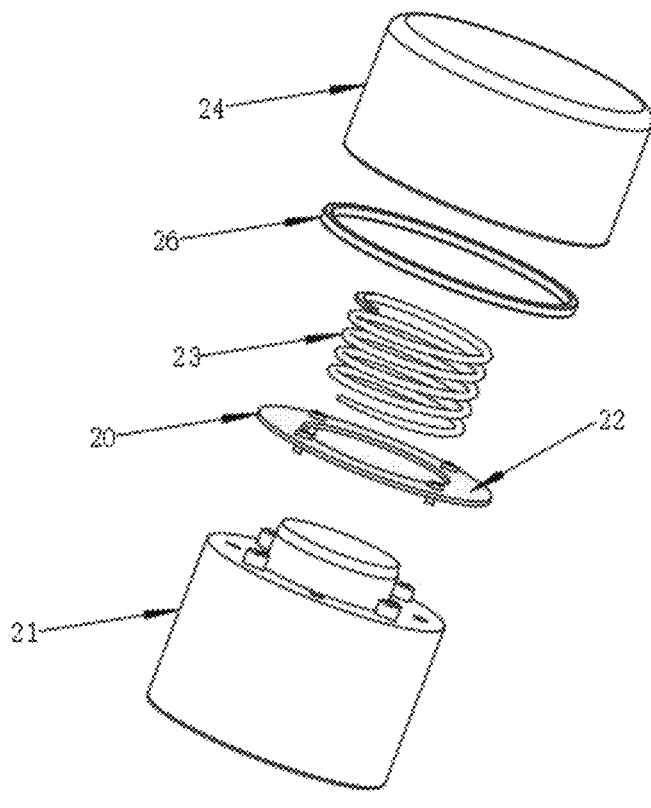
FIG. 10b shows a structural exploded view of the detection components with a dust-proof sealing component.

In the above, a dust-proof sealing part can be provided at the position where the force-bearing part 24 and the support 21 are nested with each other. For example, as shown in FIG. 10*a* or FIG. 10*b*, using a flexible and lightweight dust-proof fabric 26, one side of the fabric is fixed to the inner sidewall of the force-bearing part 24 through glue or a slot structure, and the other side is fixed to the outer sidewall of the support member 21 to achieve dustproof performance.

Figure 11:
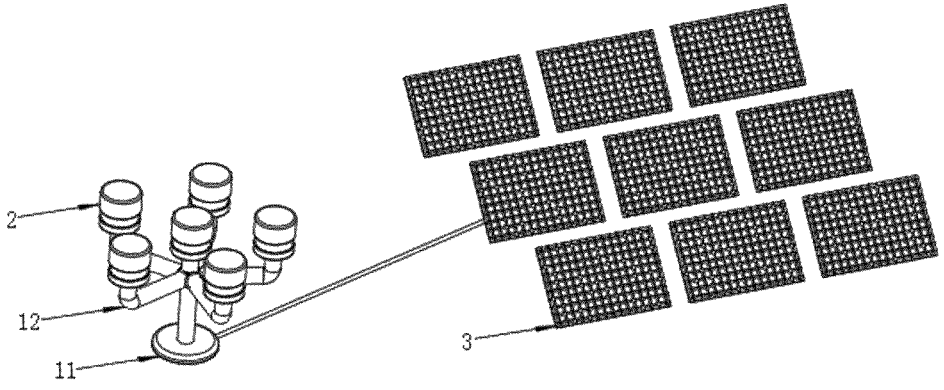
FIG. 11 shows a schematic diagram of solar power supply.

In the utility model, as shown in FIG. 11, the hail detection sensor can be powered by solar energy. For example, a photovoltaic module 3 is arranged on the side of the hail detection sensor; or, the hail detection sensor can also be powered locally by a battery. Due to the use of capacitance as detection, the sensor can achieve ultra-low power consumption in the working mode, and then assisted by the sleep mechanism, it can achieve superlong standby. And, compared with the wired power supply scheme, it reduces the current caused by wire resistance loss to achieve energy saving. In the utility model, the output signal of the hail detection sensor is transmitted to the weather station in the form of wireless communication, which solves the problem that a very high output voltage is required for wired signal transmission due to the outdoor environment (the voltage of the signal transmitted by the wire due to the large wire length and wire resistance is low). If the drop is too large, in order to enable the receiving end to receive effective signals, the output end must increase the output voltage), while controlling the cost.

Figure 12A:
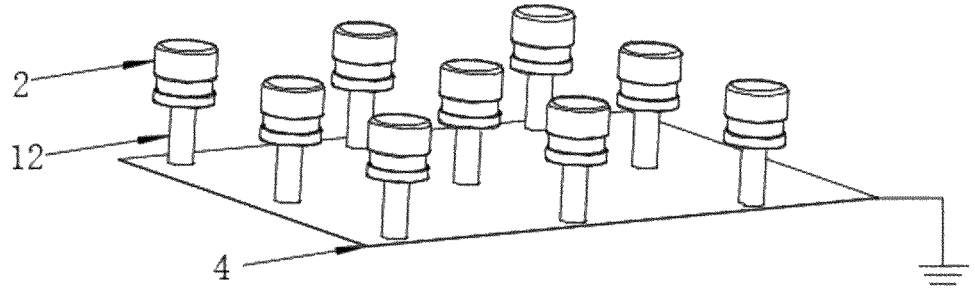
FIG. 12a shows a first configuration of the base shape and FIG. 12b shows a second configuration of the base shape.
Figure 12B:
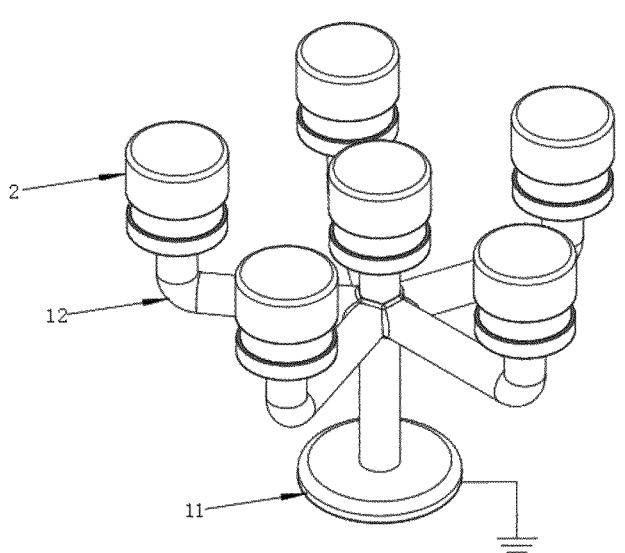

In the utility model, as the fourth improvement, for the purpose of grounding effect, the shape of the base 21 is set as a plate-shaped structure 4 as shown in FIG. 12*a*, wherein the plate-shaped structure 4 is used as a conductor, and its area satisfies the area requirements of the ground net buried underground for lightning protection, and each detection component 2 in the hail detection sensor stands on the plate-like structure 4 and establishes an electrical connection with it. In this scheme, the base 21 can be horizontally expanded and buried in a shallower underground layer;

Alternatively, the shape of the base 21 is set as a columnar structure as shown in FIG. 12*b*, the columnar structure is buried deep underground, and the area meets the area requirements of the ground net buried underground for lightning protection, and each detection component 2 in the hail detection sensor is fixed to base 21 by a bracket 12, this solution can avoid large-area laying.

Finally, it should be noted that the above embodiments are only used to illustrate the technical solutions of the present utility model, not limiting the protection scope of the present utility model. Although the utility model has been described in detail with reference to the preferred embodiments, those technical staff in the field should understand that the technical solution of the utility model can be modified or equivalently replaced without departing from the essence and scope of the technical solution of the utility model.

What is claimed is:

1. A hail detection sensor, comprising a base and at least two detection components;

each of the detection components is provided with a support, a displacement detection device, an elastic body, and a force-bearing part of a given mass, the surface of the force-bearing part is provided with a Zone I for the impact of the measured hail, and the force-bearing part is a conductor, and the force-bearing part is fixed on the support through an elastic body, the displacement detection device is used to obtain a first signal reflecting the mechanical vibration generated by the hail impacting the force-bearing part, wherein, there is a gap between each of the Zone 1, the area of each of said Zone I is configured to be smaller than a standard hail density measurement area, and the sum of the areas of each of the Zone 1 on the hail detection sensor is configured to be larger than the standard hail density measurement areal, the said standard hail density measurement area is 30 cm×30 cm or greater; and at least one of the supports is fixed to the base, and the base has electrical conductivity, and each force-bearing part is electrically connected to the base and electrically connected to earth through the base.

2. The hail detection sensor according to claim 1, characterized in that:

the area of the Zone 1 of at least one of the detection components is larger than the first region area of the other detection components.

3. The hail detection sensor according to claim 1, characterized in that: the mass of the force-bearing part of at least one of the force-bearing part is greater than the mass of the force-bearing part of the other detection components; and/or the elastic coefficient of the elastic body of at least one of the detection components is larger than the elastic coefficient of the elastic body of other detection components.

4. The hail detection sensor according to claim 1, characterized in that:

the elastic body and the support are electrically conductive, and the force-bearing part is electrically connected to the base through the elastic body and the support.

5. The hail detection sensor according to claim 1, characterized in that:

the displacement detection device includes a capacitor having a first electrode and a second electrode, the force-bearing part is used as the first electrode; and the second electrode is set on the support, the hail detection sensor is also provided with a capacitance-to-digital converter and a logic processor, the capacitance to digital converter is respectively connected to the logic processor and the second electrode, and the logic processor obtains the first signal reflecting the mechanical vibration according to the capacitance value between the second electrode and the first electrode of the detection component to which it belongs.

6. The hail detection sensor according to claim 5, characterized in that: the force-bearing part is configured to nest within the support of the detection component to which it belongs, and a sealed space is formed between the two, and the second electrode and the elastic body are located in the sealed space.

7. The hail detection sensor according to claim 6, characterized in that: the two ends of the elastic body are respectively abutted against the force-bearing part and the support of the detection components to which it belongs, and the second electrode is configured as a continuous body or a discrete body arranged around the elastic body.

8. The hail detection sensor according to claim 6, characterized in that: a dust-proof sealing part is provided at the position where the force-bearing part and the support are nested with each other.

9. The hail detection sensor according to claim 5, 6 or 7, characterized in that: the displacement detection device comprises a PCB, and the second electrode is arranged on the surface of the PCB.

10. The hail detection sensor according to claim 1, characterized in that: the minimum gap in the horizontal projection direction between each of the Zone 1 is configured to be larger than 10 cm.

11. The hail detection sensor according to claim 1, characterized in that: the hail detection sensor is locally powered by solar energy or batteries.

12. The hail detection sensor according to claim 1, characterized in that: the output signal of the hail detection sensor is transmitted to a weather station by wireless communication.

13. The hail detection sensor according to claim 1, characterized in that: the shape of the base is a plate structure, the plate structure is used as a conductor, and its area meets the area requirements of the ground net buried underground for lightning protection, each detection component in the hail detection sensor stands on the plate structure and establishes an electrical connection with it; or, the shape of the base is a columnar structure which is buried in the ground, and the area meets the area requirement of the underground ground net for lightning protection, and each detection component in the hail detection sensor is fixed to the base through a conductive bracket.

\* \* \* \* \*